United States Patent
Kim et al.

(10) Patent No.: US 7,821,711 B2
(45) Date of Patent: Oct. 26, 2010

(54) 2D-3D IMAGE SWITCHING DISPLAY SYSTEM

(75) Inventors: Dae-sik Kim, Suwon-si (KR); Sergey Chestak, Suwon-si (KR); Kyung-hoon Cha, Yongin-si (KR); Jae-phil Koo, Seoul (KR); Seon-deok Hwang, Yeongi-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 11/939,830

(22) Filed: Nov. 14, 2007

(65) Prior Publication Data

US 2008/0186575 A1 Aug. 7, 2008

(30) Foreign Application Priority Data

Feb. 7, 2007 (KR) ............... 10-2007-0012782

(51) Int. Cl.
G02B 27/22 (2006.01)
(52) U.S. Cl. ............... 359/463; 359/462; 348/59
(58) Field of Classification Search ............... 359/463, 359/462; 348/51, 59
See application file for complete search history.

(56) References Cited

U.S. PATENT DOCUMENTS

| | | | |
|---|---|---|---|
| 5,899,551 A * | 5/1999 | Neijzen et al. ............... 349/115 |
| 6,064,424 A * | 5/2000 | van Berkel et al. ............ 348/51 |
| 6,069,650 A | 5/2000 | Batersby |
| 6,128,059 A | 10/2000 | Nishiguchi |
| 6,795,241 B1 * | 9/2004 | Holzbach .................... 359/463 |
| 7,436,594 B2 * | 10/2008 | Van Berkel et al. ......... 359/462 |
| 2004/0041747 A1 | 3/2004 | Uehara |
| 2006/0203338 A1 | 9/2006 | Pezzaniti |

FOREIGN PATENT DOCUMENTS

| EP | 0833183 A1 | 4/1998 |
| EP | 1742492 A2 | 1/2007 |

OTHER PUBLICATIONS

Extended European search report dated Jul. 7, 2010, issued by the European Patent Office in counterpart European Patent Application No. 08100247.9.

* cited by examiner

*Primary Examiner*—Audrey Y Chang
(74) *Attorney, Agent, or Firm*—Sughrue Mion, PLLC

(57) ABSTRACT

Provided is a 2D-3D switching display system that includes a backlight, a liquid crystal panel which forms a 3D image using light generated by the backlight, a viewing zone separation unit which separates an image formed by the liquid crystal panel into a left eye image and a right eye image, and a display panel which transmits light passing through the viewing zone separation unit.

13 Claims, 8 Drawing Sheets

210a

210b

2D-3D IMAGE SWITCHING DISPLAY SYSTEM

CROSS-REFERENCE TO RELATED PATENT APPLICATION

This application claims priority from Korean Patent Application No. 10-2007-0012782, filed on Feb. 7, 2007, in the Korean Intellectual Property Office, the disclosure of which is incorporated herein in its entirety by reference.

BACKGROUND OF THE INVENTION

1. Field of the Invention

Systems consistent with the present invention relate to a 2D-3D image switching display, and more particularly, to an image display system able to switch easily between a 2D image and a 3D image.

2. Description of the Related Art

A three-dimensional (3D) image is formed according to the principle of stereoscopic vision through the eyes of a human being. Binocular parallax, which is generated due to distance of about 65 mm between the human eyes, can be considered as the most important factor inducing a cubic effect. General stereoscopic display techniques are roughly classified into a glasses stereoscopic display technique and a glass-less stereoscopic display technique. In the glass-less stereoscopic display technique, a 3D image can be obtained by separating left and right images without using glasses. In this regard, a parallax barrier 3D display apparatus or a lenticular 3D display apparatus can be used.

In the case of the parallax barrier 3D display apparatus, a left eye image and a right eye image are displayed on alternating vertical pixel columns and separated through a very thin vertical lattice, that is, a barrier. The left eye image in a vertical column and the right eye image in a vertical column are separated by the barrier, so that the left and right eyes respectively receive images from different view points to thereby form a 3D image.

In the case of the lenticular 3D display apparatus, the images corresponding to the left eye and the right eye are formed on a focus surface of a lenticular lens, and the images are observed through the lenticular lens, and thus a separated stereoscopic image is separated to be displayed on the right eye and the left eye according to directional characteristic of the lenticular lens.

Meanwhile, a 2D-3D image switching display apparatus has been developed in order to satisfy the users' requirements for seeing a 2D image in the 3D display apparatus. U.S. Patent Publication No. 2004/0041747 A1 discloses a conventional display apparatus which can display a 2D image using a lenticular 3D display apparatus. FIGS. 1A and 1B are views illustrating a related art 2D-3D image switching apparatus disclosed in U.S. Patent Publication No. 2004/0041747 A1.

Referring to FIGS. 1A and 1B, the related art display apparatus includes a display device 2 including a plurality of left eye pixels 41 and a plurality of right eye pixels 42 which are alternately disposed, and a first optical unit 31 and a second optical unit 32 in which lenses are alternately disposed to refract light from the pixels.

The lenses of the first optical unit 31 and the second optical unit 32 are arrayed at the same periods. When the first optical unit 31 is moved by half of the period of the lens array with respect to the second optical unit 32, a 3D image is displayed. When the first optical unit 31 is moved so that the period of the first optical unit 31 may correspond to that of the second optical unit 32, a 2D image is displayed. In the related art display apparatus, the first optical unit 31 is moved in a direction 11 perpendicular to an optical axis in order to switch between the 2D image and the 3D image. However, since the first optical unit 31 is not moved in a horizontal direction, but is moved in a curved direction along the lens shape of the second optical unit 32, a movement mechanism is complicated.

When the 3D image is displayed, the first optical unit 31 is not easily moved by half of the pitch of a lens cell of the second optical unit 32, and there is almost no cross-talk in an optimized viewing point in 3D mode. However, at this time, cross-talk is greatly increased in a middle viewing zone other than viewing point, and thus an image deteriorates and the brightness of the image is reduced. Accordingly, a viewing zone in which the 3D image can be observed without cross-talk is quite narrow.

FIG. 2 is a view illustrating a related art 2D-3D display apparatus disclosed in U.S. Pat. No. 6,069,650. The related art 2D-3D display apparatus includes a lenticular means 115. The lenticular means 115 includes a lenticular sheet 130, liquid crystal layer 138, and a plate 136. A thin film 134 is formed between the lenticular sheet 130 and the liquid crystal sheet 138. The lenticular sheet 130 includes a lenticular element 116. In addition, the related art 2D-3D display apparatus includes a power source 140 for supplying power to the liquid crystal sheet 138 and a switch 141.

In the related art 2D-3D display apparatus of FIG. 2, according to the switching state of the power source 140, the refraction indexes of the liquid crystal layer 138 and the lenticular sheet 130 may be the same or different. When the refraction indexes of the liquid crystal sheet 138 and the lenticular sheet 130 are the same, light incident on the lenticular sheet 130 is transmitted through the lenticular sheet 130 and liquid crystal layer 130 without being refracted to display an image of a 2D mode. On the other hand, when the refractive indexes of the liquid crystal sheet 138 and the lenticular sheet 130 are different, the lenticular sheet 130 separates an image and displays a left eye image and a right eye image to embody an image of a 3D mode.

In order to display a 3D image having good quality, the thickness of the liquid crystal sheet 138 should be very thin. However, since a lenticular surface corresponding to a lenticular sheet is formed on a lower surface of the liquid crystal sheet 138, there is a limit in forming the thin liquid crystal sheet 138. In addition, since a manufacturing technique of the lenticular sheet formed by filling a lens with liquid crystal is not generalized and it is difficult to switch a liquid crystal layer, the reliability and performance of a related art 2D-3D display apparatus is low.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a 2D-3D image switching display system which can easily switch a 2D and a 3D and in which a viewing zone is well separated.

According to an aspect of the present invention, there is provided a 2D-3D switching display system comprising a backlight, a liquid crystal panel which forms a 3D image using light generated by the backlight, a viewing zone separation unit which separates an image formed by the liquid crystal panel into a left eye image and a right eye image, and a display panel which transmits light passing through the viewing zone separation unit.

The viewing zone separation unit may be a lenticular lens array.

The lenticular lens array comprises a lenticular lenses inclined in a perpendicular direction of the 2D-3D switching display system.

The viewing zone separation unit may be a micro lens array.

The micro lens array comprises a plurality of micro lenses having a round shape, a quadrangle shape, or a hexagon shape.

The micro lens array wherein when the plurality of micro lenses has one of a round shape or a quadrangle shape, the micro lenses are disposed in every row at half pitch from each other in the row direction.

The display panel may be a liquid crystal panel or an organic light emitting diode panel.

According to another aspect of the present invention, there is provided a 2D-3D switching display system including a first display panel which forms a 3D image, a viewing zone separation unit which separates an image formed by the first display panel into a left eye image and a right eye image, and a second display panel which transmits light passing through the viewing zone separation unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which a 2D-3D switching display system according to exemplary embodiments of the invention is shown.

The 2D-3D switching display system includes two display panels, and it can display an image, or selectively, transmit incident light. Accordingly, the 2D-3D switching display system can display a 2D image or a 3D image.

Figure 1A:
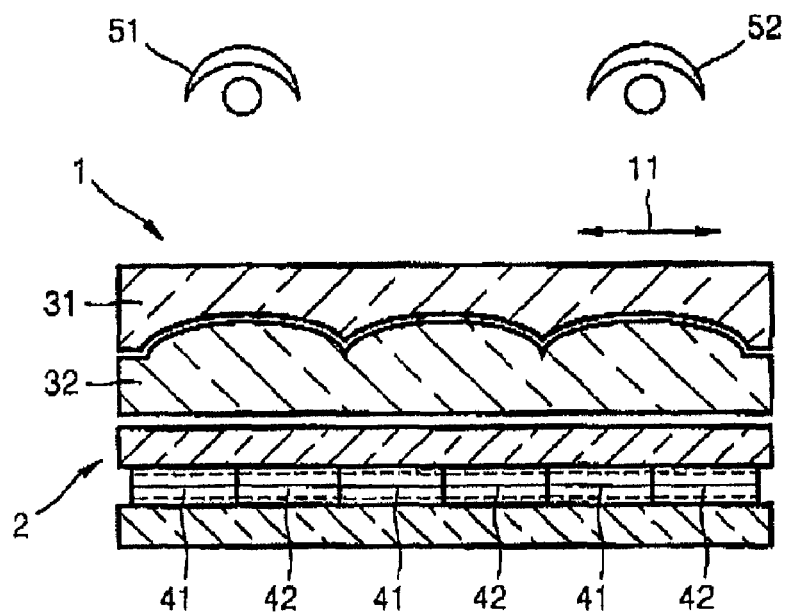
FIGS. 1A and 1B are views illustrating a related art 2D-3D image switching apparatus disclosed in U.S. Patent Publication No. 2004/0041747 A1.
Figure 1B:
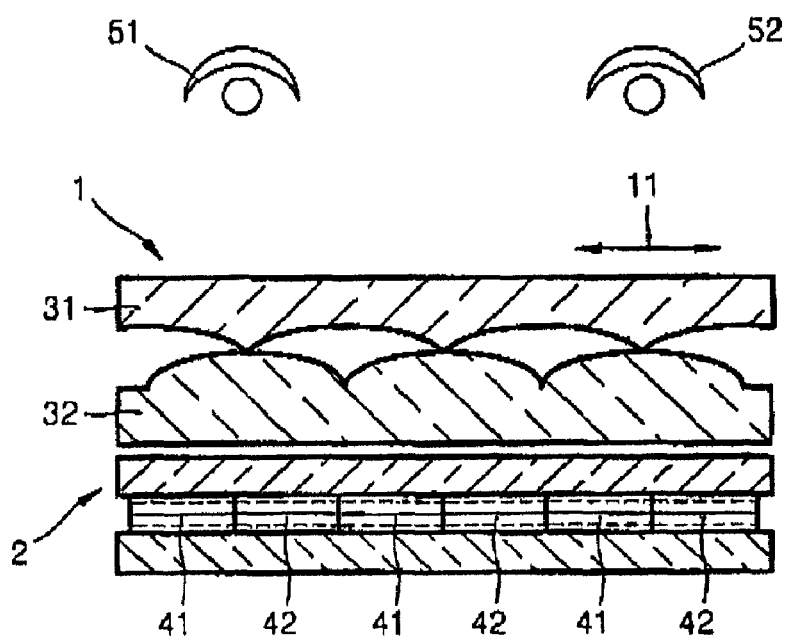
Figure 2:
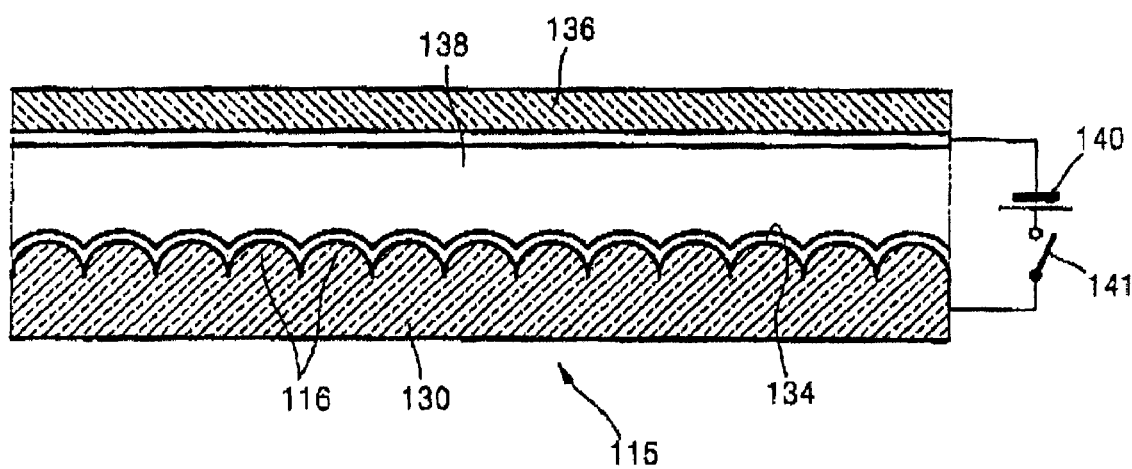
FIG. 2 is a view illustrating a related art 2D-3D display apparatus disclosed in U.S. Pat. No. 6,069,650.
Figure 3:
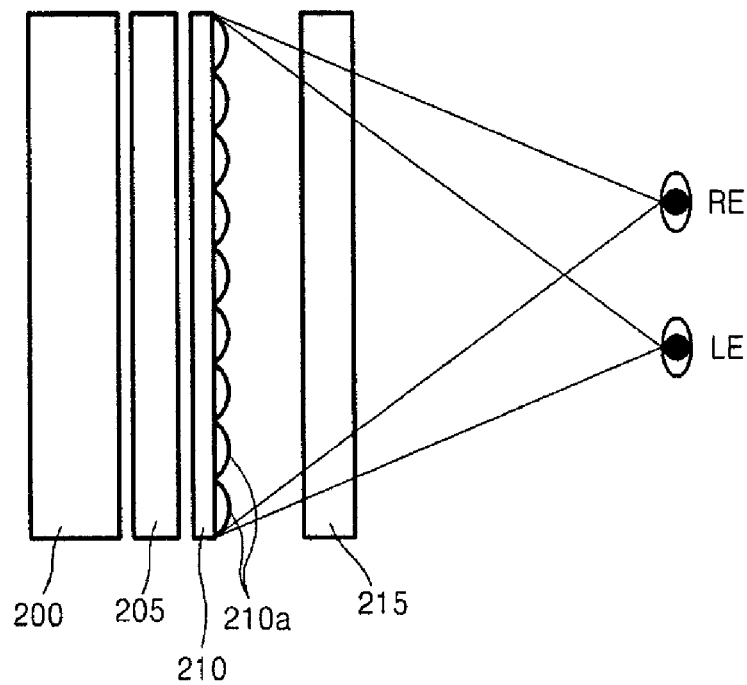
FIG. 3 is a view illustrating the case where a 3D image is displayed in a 2D and 3D switching display system according to an exemplary embodiment of the present invention.

FIG. 3 is a view illustrating the case where a 3D image is displayed in a 2D3D switching display system according to an exemplary embodiment of the present invention.

Referring to FIG. 3, the 2D and 3D switching display system includes a backlight 200, a first display panel 205, a viewing zone separation unit 210, and second display panel 215. The first display panel 205 forms a 3D image using light emitted from the backlight 200, or transmits light emitted from the backlight 200. The first display panel 205 receives light from the backlight 200 to form an image through optical spatial modulation. For example, the first display panel 205 may include a liquid crystal panel.

The viewing zone separation unit 210 separates an image formed by the first display panel 205 into a left eye region and a right eye region to display the 3D image. For example, the viewing zone separation unit 210 may include a lenticular lens array or a micro lens array 210a. The second display panel 215 forms a 2D image or originally transmits incident light, according to an input image signal. For example, the second display panel 215 may be a liquid crystal panel or organic light emitting diode (OLED) panel.

The 2D-3D switching display system having the above structure operates as follows. Referring to FIG. 3, in order to embody a 3D mode for displaying a stereoscopic image, light emitted from the backlight 200 is incident on the first display panel 205, and then the transmittances of color light of each pixel are differed according to a 3D image signal input to the first display panel 205 to form a 3D color image including a left eye image and a right eye image. In addition, the 3D color image is separated into the left eye image and the right eye image by the viewing zone separation unit 210. The second display panel 215 is driven so that incident light may be originally transmitted, and synchronized with a first display panel 205. Accordingly, the 3D image separated by the viewing zone separation unit 210 is displayed as a stereoscopic image through the second display panel 215 and observed by a viewer.

In order to form the 3D image, the first display panel forms the 3D image, and a second display panel is synchronized with the first display panel so that incident light may be transmitted through the second first display panel.

Figure 4:
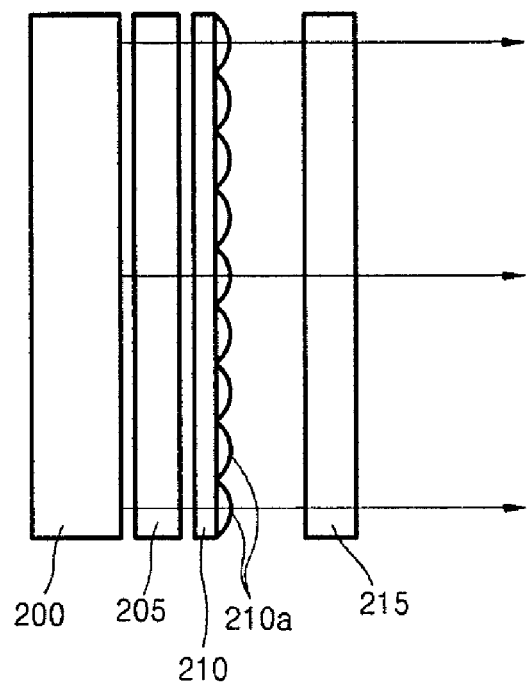
FIG. 4 is a view illustrating the case where a 2D image is displayed in the 2D-3D switching display system of FIG. 3, according to an exemplary embodiment of the present invention.

FIG. 4 is a view illustrating the case where a 2D image is displayed in the 2D-3D switching display system of FIG. 3.

Referring to FIG. 4, in order to embody a 2D mode for displaying a 2D image, light emitted from the backlight 200 is incident on the first display panel 205, and an image signal is input to the first display panel 205 so as to generate white light. Here, the first display panel 205 functions as a light source together with the backlight 200. The light white generated by the first display panel 205 passes through the viewing zone separation unit 210. At this time, the light passing through the viewing zone separation unit 210 is originally maintained as white light, but an image is not separated. In addition, a 2D image signal is input to the second display panel 215, and the transmittances of each pixel are differed according to the image signal. Accordingly, the second display panel 215 forms the 2D image.

In order to form the 2D image, the first display panel 205 forms white light, and the second display panel 215 is synchronized with the first display panel 205 to form the 2D image.

Figure 5:
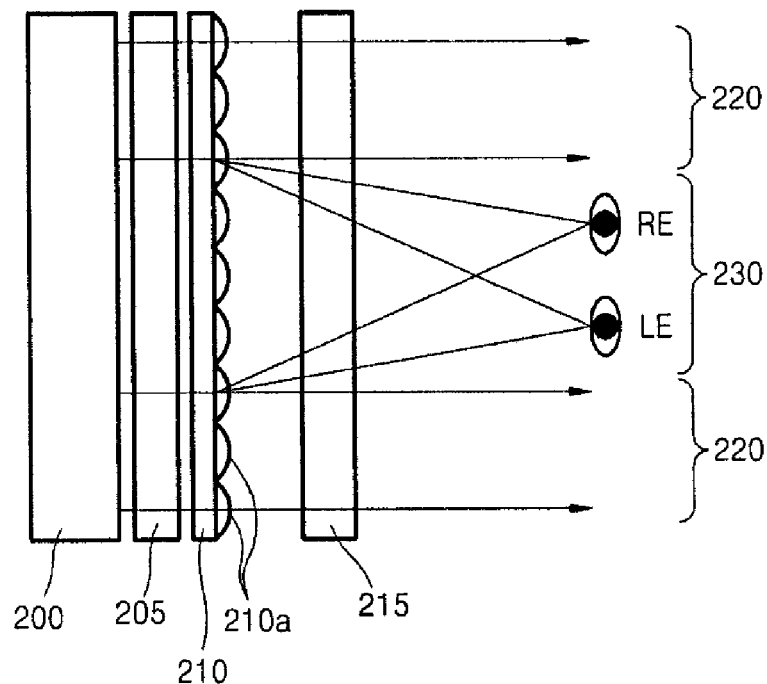
FIG. 5 is a view illustrating the case where a 3D image and a 2D image are partially displayed in the 2D-3D switching display system of FIG. 3, according to an exemplary embodiment of the present invention.

FIG. 5 is a view illustrating the case where a 3D image and a 2D image are partially displayed, according to an exemplary embodiment of the present invention. In order to emphasize, or display stereoscopically, a part of an entire image, it is effective that the 3D image be partially displayed as illustrated in FIG. 5. To achieve this, the 3D image is formed on a part of the first display panel 205, and white light is displayed on the other part of the first display panel 205. The second display panel 215 is synchronized with the first display panel 205 so that the 3D image of the first display panel 205 may be originally transmitted through a 3D mode region 230 of the second display panel 215 corresponding to a 3D image region of the first display panel 205. Accordingly, the 3D image formed by the first display panel 205 is separated into a left eye image and a right eye image by the viewing zone separation unit 210, and the second display panel forms the same image to display the 3D image.

The 2D image is formed in a 2D mode region 220 of the second display panel 215 corresponding to a region of the first display panel 205, from which white light is generated. Accordingly, the white light generated by the first display panel 205 passes through the viewing zone separation unit 210 to be incident on the second display panel 215, and the white light functions as a light source with respect to a 2D image region of the second display panel 215 to display the 2D image.

As described above, the 2D and 3D modes can be freely exemplarily embodied by controlling the first and second display panels 205 and 215.

Figure 6:
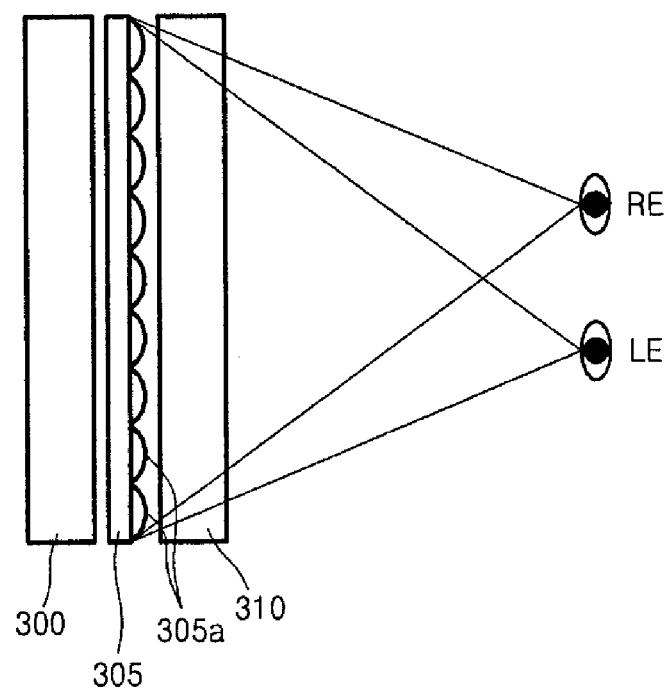
FIG. 6 is a view illustrating a 2D-3D switching display system according to another exemplary embodiment of the present invention.

FIG. 6 is a view illustrating a 2D-3D switching display system according to another exemplary embodiment of the present invention. The 2D-3D switching display system includes a first display panel 300, a viewing zone separation unit 305, and a second display panel 310. Since the first display panel 300 is a self-emission panel, there is no need for an additional light source. For example, the first display panel 300 may include an organic light emitting diode panel or a field emission display.

The second display panel 310 includes a liquid crystal panel or organic light emitting diode panel so that light passing through the viewing zone separation unit 305 may pass through the second display panel 310 or form a 2D image. The viewing zone separation unit 305 may includes a lenticular lens or micro lens 305a.

In order to display a 3D image, the first display panel 300 forms the 3D image, and the second display panel 310 is synchronized with the first display panel 300 so that incident light is originally transmitted through the second display panel 310. The 3D image formed by the first display panel 300 passes through the viewing zone separation unit 305 to be separated into a left eye image and a right eye image, and the separated image passes through the second display panel and displayed as the 3D image.

In order to form the 2D image, the first display panel 300 generates white light. The white light passes through the viewing zone separation unit 305 and functions as a light source with respect to the second display panel. The second display panel 310 forms the 2D image using the white light. In order to partially form the 3D image, the first display panel 300 forms the 3D image in a region for forming the 3D image and the incident 3D image is transmitted by the second display panel 310. Simultaneously, in the other region other than 3D image region, the first display panel 300 forms white light, and the second display panel 310 forms the 2D image.

Figure 7A:
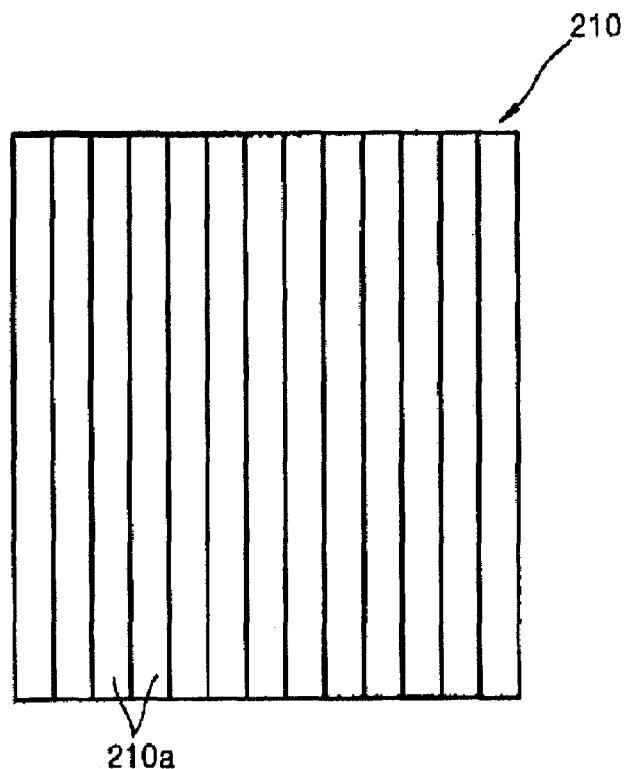
FIG. 7A is a view illustrating the case where a lenticular lens array included in a 2D-3D switching display system is disposed in a perpendicular direction to the 2D-3D switching display system, according to an exemplary embodiment of the present invention.
Figure 7B:
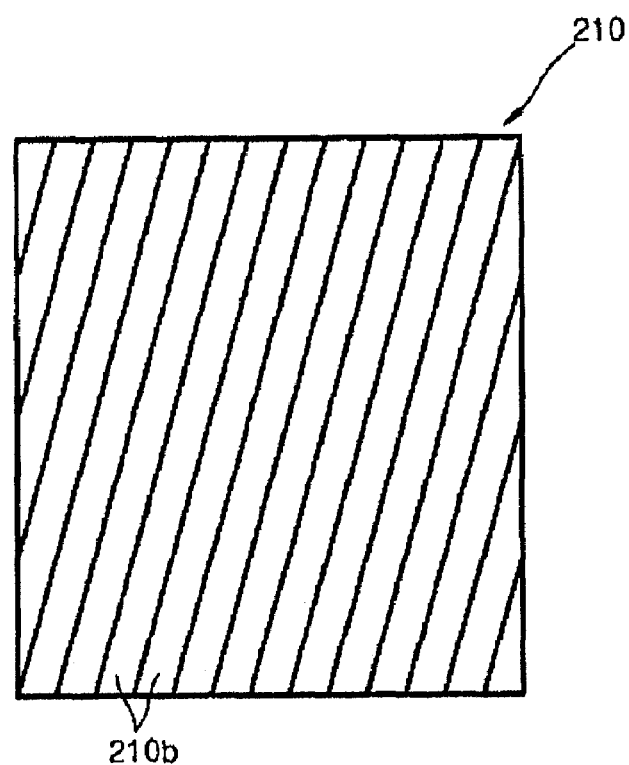
FIG. 7B is a view illustrating the case where a lenticular lens array included in a 2D-3D switching display system is inclined at a perpendicular direction to the 2D-3D switching display system, according to another exemplary embodiment of the present invention.

Hereinafter, a viewing zone separation unit included in the display device according to an exemplary embodiment of the present invention will be described. The viewing zone separation unit may include a lenticular lens array or a micro lens array. Referring to FIG. 7A, the lenticular lens array includes a plurality of lenticular lenses 210a which may be parallel to one another in a perpendicular direction of the 2D/3D switching display system. Referring to FIG. 7B, the lenticular lens 210b may be inclined in a perpendicular direction of the 2D-3D switching display system. When the lenticular lens 211b is inclined, the resolving power of a perpendicular direction as well as the resolving power of a horizontal direction can be improved.

Figure 8:
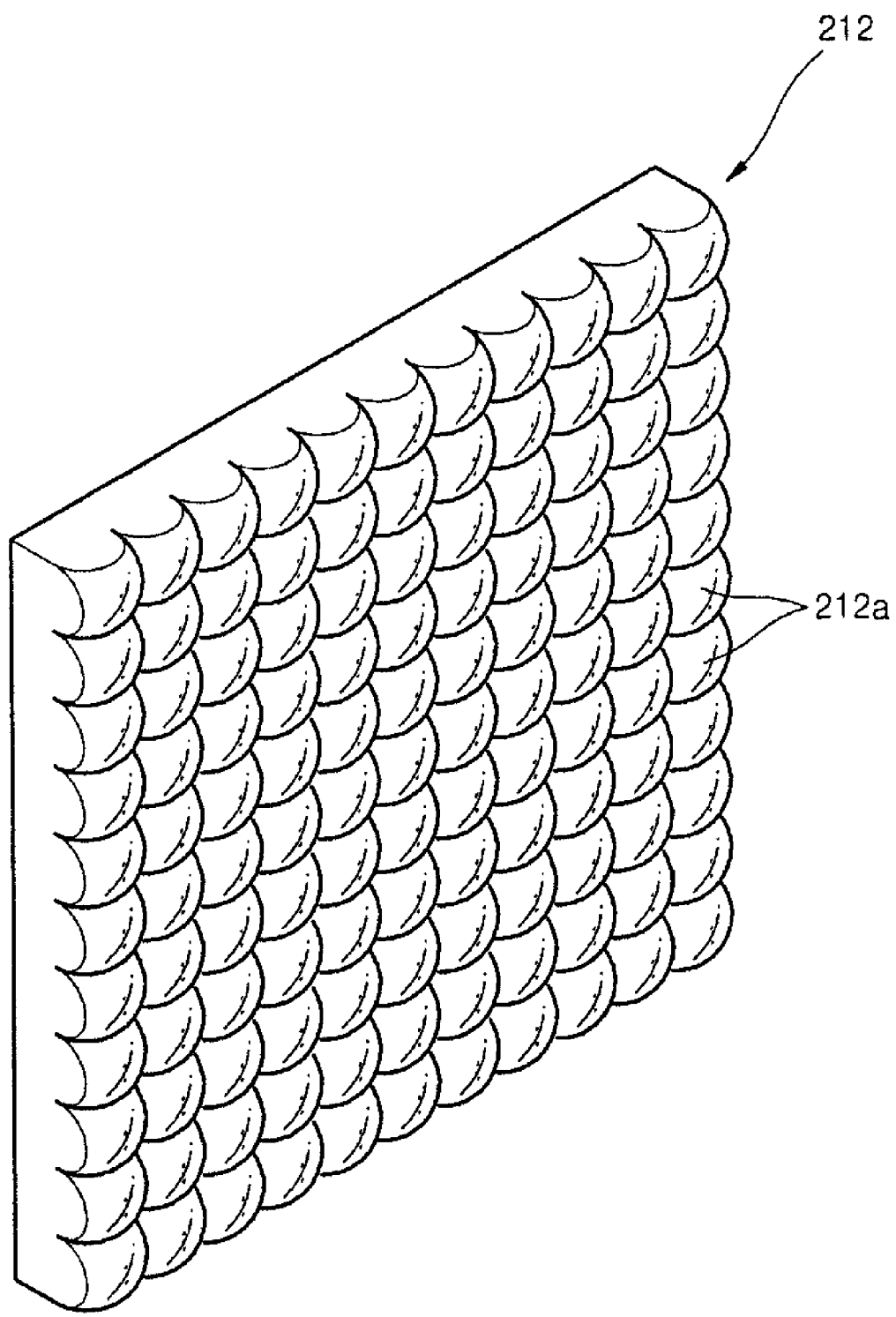
FIG. 8 is a view illustrating the case where a micro lens array included in a 2D-3D switching display system has a shape of a quadrangle, according to an exemplary embodiment of the present invention.
Figure 9A:
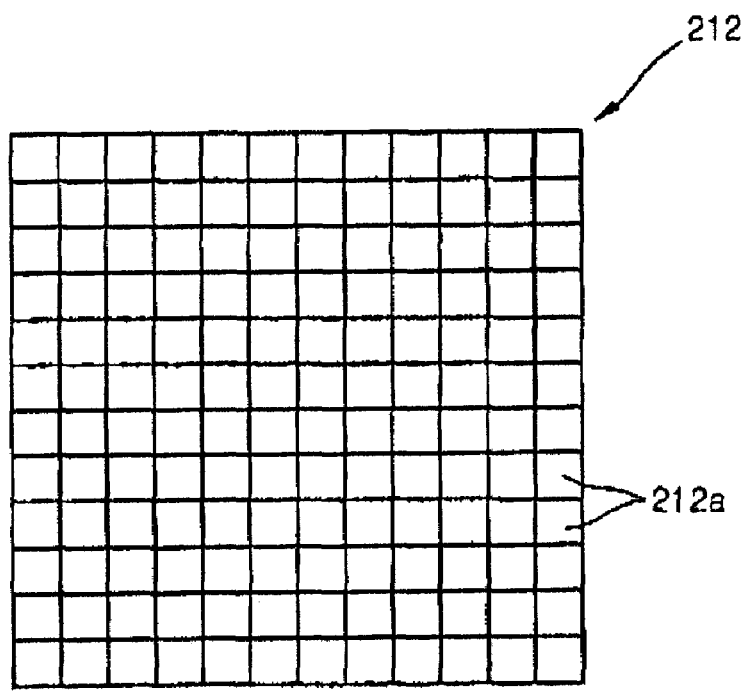
FIG. 9A is a front view illustrating the micro lens array of FIG. 8.
Figure 9B:
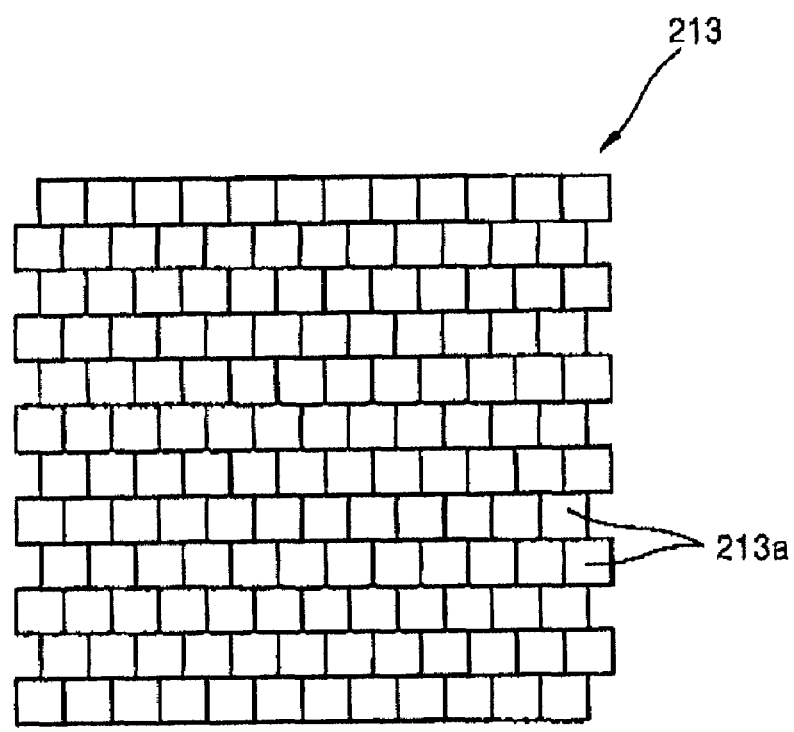
FIG. 9B is a view illustrating the case where a micro lens array included in a 2D-3D switching display system is disposed such that micro lenses in the array are disposed in every row at half pitch from each other in the row direction, according to another exemplary embodiment of the present invention.

FIG. 8 is a view illustrating a micro lens array 212 in which a plurality of micro lenses 212a are disposed in a 2D type, according to an exemplary embodiment of the present invention. The micro lenses 212a may each have various shapes, for example, a round shape, a quadrangle shape, or a hexagon shape. Referring to FIG. 8, the micro lenses 212a each have a quadrangle shape. Meanwhile, the micro lenses 212a may be disposed in cross stripes, as illustrated in FIG. 9A. In addition, a micro lens array 213 includes a plurality of micro lenses 213a disposed in every row to be shifted at half pitch from each other in the row direction, as illustrated in FIG. 9B.

Figure 10:
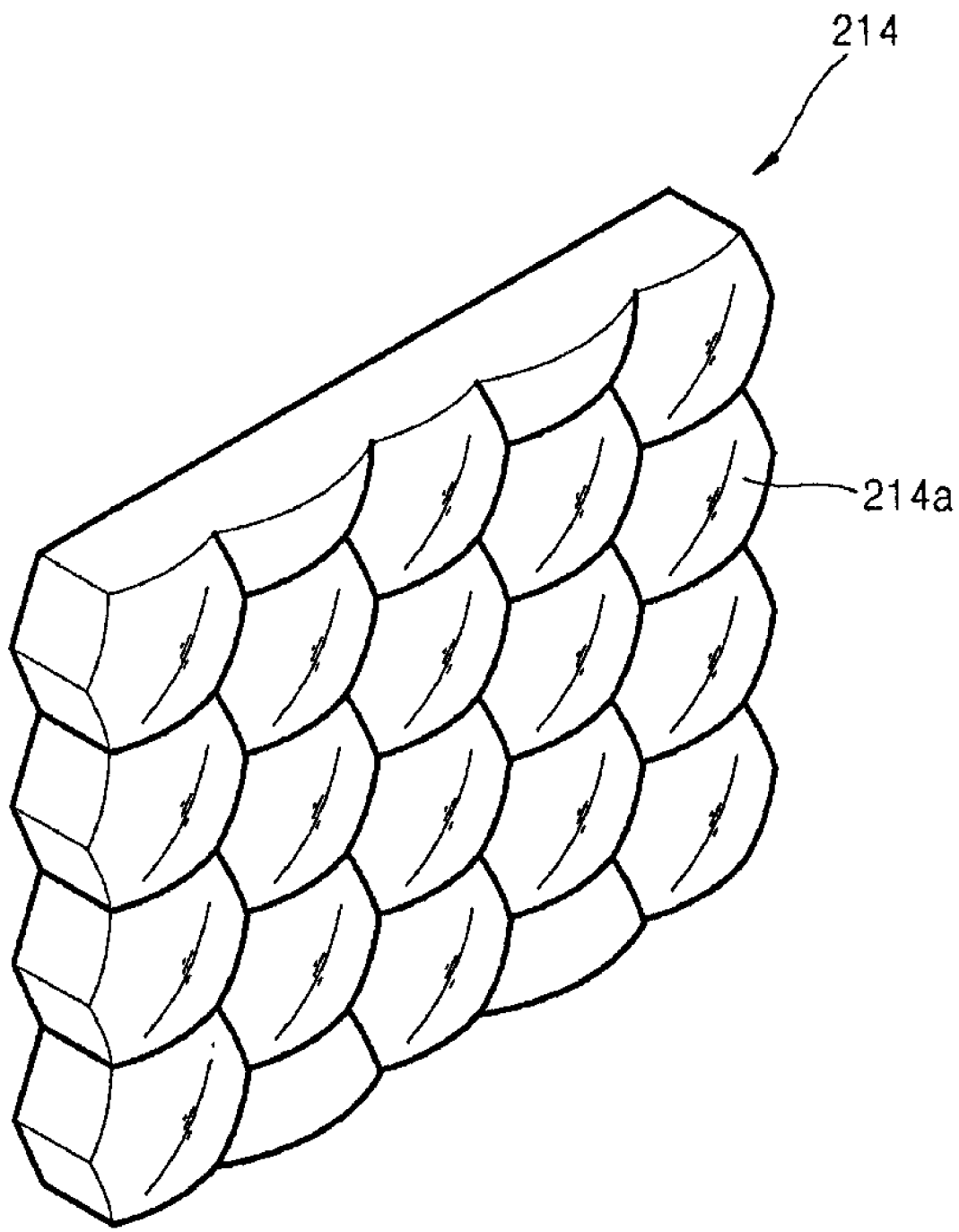
FIG. 10 is a view illustrating the case where a micro lens array included in a 2D-3D switching display system has a hexagon shape, according to another exemplary embodiment of the present invention.

FIG. 10 is a view illustrating a micro lens array 214 including a plurality of micro lenses 214a having a hexagon shape. Since the micro lenses 214a having a hexagon shape are disposed to have a honeycomb shape, concentration can be increased to improve resolving power.

As described above, the 2D-3D switching display system according to the exemplary embodiments of the present invention include two display panels, and one of the two display panels selectively forms an image. Accordingly, a 2D image and a 3D image can be easily exemplarily embodied. Since a technique, in which an image is embodied by a display panel, is already well known, the performance of the 2D-3D switching display system according to the present invention is stable, and the 2D-3D switching display system can be easily manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A 2D-3D switching display system, comprising:
a backlight;
a first display panel comprising a liquid crystal panel which displays a left eye image and a right eye image in 3D mode using light generated by the backlight or transmits light generated by the backlight while in 2D mode;

a viewing zone separation unit which separates the left eye image and the right eye image in 3D mode or transmits light in 2D mode; and a second display panel which transmits light passing through the viewing zone separation unit while in 3D mode or displays the 2D image using light transmitted through the first display and the viewing zone separation zone while in 2D mode;

wherein the second display panel is driven to synchronize with the first display panel to transmit the left eye image and the right eye image in the 3D mode and to display the 2D image in the 2D mode.

2. The system of claim 1, wherein the viewing zone separation unit comprises a plurality of lenticular lenses inclined with respect to the horizontal axis of the lenticular lens plane.

3. The system of claim 1, wherein the viewing zone separation unit comprises a plurality of micro lenses having a round shape, a quadrangle shape, or a hexagon shape.

4. The system of claim 3, wherein the plurality of micro lenses are disposed in every row at half pitch of the micro lenses from each other in the row direction with respect to adjacent rows of the micro lenses, if the plurality of micro lenses has one of the round shape or the quadrangle shape.

5. The system of claim 1, wherein the second display panel comprises a liquid crystal panel or an organic light emitting diode panel.

6. A 2D-3D switching display system, comprising:
a first display panel which displays a left eye image and a right eye image in a 3D mode or emits white light in a 2D mode selectively;
a viewing zone separation unit which separates the left eye image and the right eye image; and
a second display panel which transmits light passing through the viewing zone separation unit in the 3D mode or displays a 2D image using the white light in the 2D mode;
wherein the second display panel is driven to synchronize with the first display panel to transmit the left eye image and the right eye image in the in 3D mode and display the 2D image in the 2D mode.

7. The system of claim 6, wherein the viewing zone separation unit comprises a lenticular lens array.

8. The system of claim 7, wherein the lenticular lens array is inclined with respect to the horizontal axis of the lenticular lens plane.

9. The system of claim 6, wherein the viewing zone separation unit is a micro lens array.

10. The system of claim 9, wherein the micro lens array comprises a plurality of micro lenses having a round shape, a quadrangle shape, or a hexagon.

11. The system of claim 10, wherein the micro lenses are disposed in every row to be shifted at half pitch of the micro lenses from each other in the row direction with respect to adjacent rows of the micro lenses, if the plurality of micro lenses comprises one of the round shape or quadrangle shape.

12. The system of claim 6, wherein the first display panel is one of an organic light emitting diode panel or a field emission display.

13. The system of claim 6, wherein the second display panel is one of a liquid crystal panel or an organic light emitting diode panel.

* * * * *